(12) United States Patent
Nemo et al.

(10) Patent No.: US 11,423,760 B2
(45) Date of Patent: Aug. 23, 2022

(54) DEVICE FOR DETECTING DROWNING INDIVIDUALS OR INDIVIDUALS IN A SITUATION PRESENTING A RISK OF DROWNING

(71) Applicant: Atos Integration, Bezons (FR)

(72) Inventors: Clémentine Nemo, Opio (FR); Nicolas Lutz, Valbonne (FR); Gérard Richter, St. Jeannet (FR); Nicolas Lebreton, Mougins (FR)

(73) Assignee: BULL SAS, Les Clayes-sous-Bois (FR)

( * ) Notice: Subject to any disclaimer, the term of this patent is extended or adjusted under 35 U.S.C. 154(b) by 23 days.

(21) Appl. No.: 16/999,227

(22) Filed: Aug. 21, 2020

(65) Prior Publication Data

US 2021/0056829 A1 Feb. 25, 2021

(30) Foreign Application Priority Data

Aug. 23, 2019 (FR) ...................................... 1909386

(51) Int. Cl.
*G08B 21/08* (2006.01)
*G06V 20/40* (2022.01)
*G06V 30/194* (2022.01)

(52) U.S. Cl.
CPC ............. *G08B 21/08* (2013.01); *G06V 20/41* (2022.01); *G06V 30/194* (2022.01)

(58) Field of Classification Search
CPC ........ G06K 9/00718; G06K 9/66; G06N 3/04; G06N 20/00; G08B 21/08; G06V 20/41; G06V 30/194
See application file for complete search history.

(56) References Cited

U.S. PATENT DOCUMENTS

2020/0388135 A1* 12/2020 Vaknin ................... G08B 21/08

OTHER PUBLICATIONS

Computer English Translation of Chinese patent No. 108647575 A, pp. 1-11. (Year: 2018).*
Computer English Translation of WIPO application publication No. WO 2017French document No. WO 2017/130187 A1, pp. 1-12. (Year: 2017).*

(Continued)

*Primary Examiner* — Daniel G Mariam
(74) *Attorney, Agent, or Firm* — Arc IP Law, PC; Joseph J. Mayo (57) ABSTRACT

The present invention relates to a device (2) for detecting drowning individuals or individuals in a situation presenting a risk of drowning, comprising at least one program of codes that are executable on one or more processing hardware components such as a microprocessor, the program being stored in memory in at least one readable medium and implementing an artificial neural network (20) having an automatic learning architecture composed of several layers, the artificial neural network (20) being pre-trained on image data from at least one standard non-specific database, the program being characterized in that the neural network is further trained a second time by learning transfer on image data from videos of simulated or real drowning situations or situations presenting a risk of drowning, the trained program being configured by this learning transfer to identify, preferably in real time, drowning situations or situations presenting a risk of drowning based on new image data provided.

16 Claims, 2 Drawing Sheets

(56) References Cited

OTHER PUBLICATIONS

European Search Report issued in EP20191832.3, dated Jan. 25, 2021 (9 pages), and translation thereof.
Preliminary Search Report issued in FR1909386, dated Jun. 17, 2020 (10 pages).
How-Lung Eng, et al., "DEWS: A Live Visual Surveillance System for Early Drowning Detection at Pool", IEEE Transactions on Circuits and Systems for Video Technology, Institute of Electrical and Electronics Engineers; vol. 18, No. 2 (Feb. 1, 2008); pp. 196-210.

* cited by examiner

DEVICE FOR DETECTING DROWNING INDIVIDUALS OR INDIVIDUALS IN A SITUATION PRESENTING A RISK OF DROWNING

TECHNICAL FIELD OF THE INVENTION

The present invention relates in general to the field of devices for detecting drowning individuals or in a situation presenting a risk of drowning, in particular devices incorporating a camera for detecting said drowning risks.

PRIOR ART

Several devices exist at the current time for detecting individuals who are sinking in a pool.

Patent application EP3408841 A1 relates to a fixed device submerged in a swimming pool, the device comprising an underwater camera for detecting swimmers in distress who are sinking to the bottom of the water. The video data is analyzed by a simple AI using a machine learning algorithm in order to reduce the number of false alerts, for example when a swimmer is holding their breath at the bottom of the swimming pool. When a drowning situation is detected, an alert is sent to a receiver. These alerts may be an audible alarm present on the device fixed to the swimming pool, or on a remote alarm unit. However, this type of device can only be used when submerged, in a pool, for spotting a swimmer who has sunk.

Patent application CN108010273 discloses a portable device (worn by the swimmer) capable of detecting drowning by measuring different factors, namely data relating to movements, heart rate and location. The detection is based on the analysis of the recovered data and analyzed by an AI in a cloud server. This type of device enables individual monitoring of the user, but is inadequate for monitoring an area rather than a specific individual.

Patent application CN206491410 discloses a watch-type bracelet worn by the swimmer for detecting drowning. The bracelet incorporates a water pressure measuring module, a GPS, a heart rate monitor, and displays a map with a particular point. This document reduces the analysis of the data to an item of data, in this case water pressure, exceeding a threshold, and this may cause a large number of false positives. Again, this type of device enables individual monitoring of the user, but is inadequate for monitoring an area rather than a specific individual.

Consequently, there is a need to better identify situations presenting a risk of drowning, in terms of speed and effectiveness of the detection. It is necessary to quickly identify and send an alert following a drowning, if possible without waiting for the swimmer to have lost consciousness and sunk. The known devices all have a very limited and specific monitoring area (the bottom of a pool, or even a portion of the bottom of a pool, depending on the opaqueness of the water), or even just individual monitoring. In addition, each document proposes detecting an individual once they have drowned, inter alia by detecting a swimmer touching the bottom of the pool. There is no device for carrying out monitoring other than in a swimming pool, for example at the seaside, where the devices described previously do not work, or only work ineffectively and inadequately.

DISCLOSURE OF THE INVENTION

The object of the present invention is therefore to propose a device for detecting drowning individuals or individuals in a situation presenting a risk of drowning, making it possible to overcome at least some of the disadvantages of the prior art.

This aim is achieved by a device for detecting drowning individuals or individuals in a situation presenting a risk of drowning, comprising at least one program of codes that are executable on one or more processing hardware components such as a microprocessor, the program being stored in memory in at least one readable medium and implementing an artificial neural network having an automatic learning architecture composed of several layers, the artificial neural network being pre-trained on image data from at least one standard non-specific database, the neural network of the program being also trained a second time by learning transfer using image data from videos of simulated or real drowning situations or situations presenting a risk of drowning, the trained program being configured by this learning transfer to identify, in new image data provided, preferably in real time, drowning situations or situations presenting a risk of drowning.

According to one particular feature, the device for detecting drowning individuals or individuals in a situation presenting a risk of drowning, comprising at least one program of codes that are executable on one or more processing hardware components such as a microprocessor, the program being stored in memory in at least one readable medium and implementing an artificial neural network having an automatic learning architecture composed of several layers, the artificial neural network comprising:

- A first layer comprising a network model, preferably a convolutional neural network, CNN, pre-trained on image data from a database of standard images, for example public, the image data being annotated and classified,
- A second layer comprising a recurrent network, preferably a short and long-term memory, LSTM, recurrent network, pre-trained on video sequences from a base of standard video data, the video sequences being annotated and classified,
- A third layer comprising a final classifier trained using video sequences from a specific database of videos comprising simulated or real drowning situations or situations presenting a risk of drowning, the video sequences being annotated and classified, the classifier being configured to provide, as a result, a probability of detecting a situation presenting a risk based on video sequences, The program being configured to use the detection probabilities to identify, in video sequences of a video stream provided, preferably by sensors, in particular a camera, and preferably in real time, drowning situations or situations presenting a risk of drowning.

According to another particular feature, the output values of the first layer are composed of latent representation vector of the images and are combined to form sequences of latent representation vectors as input values for the second layer.

According to another particular feature, the outputs of the second layer form a representation vector of the video sequence, provided as input for the third layer.

According to another particular feature, the device further comprises a notification module able to send an alert message to an information receiving device.

According to another particular feature, the program, during the detection of a drowning situation or a situation presenting a risk of drowning, executes a code making it possible to calculate and indicate the location, for example the GPS location, of the detected situation.

According to another particular feature, the program is further configured to process the image or the image stream received in order to produce an augmented image or a stream of augmented images, displaying for example an area containing the situation presenting a risk.

According to another particular feature, the device further comprises a database of video sequences on which the detected situations presenting a risk are stored, the classifier being able to be trained by said detected situations.

According to another particular feature, the device can communicate with another similar detection device in order to share the detected situations presenting a risk that are stored in their video sequence database in order to improve their classifier.

The invention also relates to a system for monitoring and detecting individuals in a situation presenting a risk of drowning or situations presenting a risk of drowning, the detection being carried out by the device according to any one of the preceding claims, said system further comprising:
- at least one image sensor, preferably a sensor for image data and video sequences from a video stream, the sensor being configured to provide video sequences to the program of the detection device,
- at least one information receiving device configured to inform a user that a drowning situation or a situation presenting a risk of drowning has been detected, the detection device being configured to send a message by a notification module to the information device when one of the video sequences provided by the image sensor is considered to correspond to a drowning situation or a situation presenting a risk of drowning from its database.

According to another particular feature, the image sensor is mounted on a mast connected to said detection device.

According to another particular feature, the information receiving device is configured to display location information and/or an augmented image of the situation presenting a risk.

According to another particular feature, the information receiving device comprises a connected watch executing an application configured to display the information received by said information device, and also an audible and/or vibratory alert.

The invention also relates to a method for training by learning transfer of an automatic learning program configured for detecting drowning individuals or individuals in a situation presenting a risk of drowning, the program being stored in memory in at least one readable medium and implementing an artificial neural network having an automatic learning architecture composed of several layers, the method comprising at least the following steps:
- Non-specific training of the artificial neural network by providing image data from a database of standard images and video sequences, wherein the image data and the video sequences have been previously annotated and classified, then
- Specialized training of the artificial neural network by providing video sequences from videos of simulated or real drowning situations or situations presenting a risk of drowning According to another particular feature, the training method comprises at least the following steps:
- Training a first layer of the program comprising a network model, preferably a convolutional neural network, CNN, by providing image data from a database of standard images, for example public, wherein the image data has been previously annotated and classified,
- Training a second layer of the program comprising a recurrent network, preferably a short and long-term memory, LSTM, recurrent network, by providing video sequences from a database of standard videos, preferably public, wherein the video sequences have been previously annotated and classified,
- Training a third layer of the program comprising a final classifier by providing video sequence data from simulated or real drowning situations or situations presenting a risk of drowning, the video data having been chosen specifically and annotated as being situations presenting a risk of drowning, the classifier trained in this way being configured to provide, as a result, a probability of detecting a situation presenting a risk based on video sequences.

The invention also relates to a method for detecting and monitoring drowning individuals or individuals in a situation presenting a risk of drowning, comprising at least one image sensor, a detection device comprising a program of codes that are executable on one or more processing hardware components such as a microprocessor, the program being stored in memory in at least one readable medium and comprising an artificial neural network having an automatic learning architecture and a user's information device, the method comprising at least the following steps:
- Pre-training said program by a method according to the preceding claim,
- Providing video sequences by an image sensor to the detection device comprising
- Real-time analysis of said video sequences by said artificial neural network, and providing a probability of detecting a situation presenting a risk,
- Detecting a situation presenting a risk, when said probability of detection is greater than a previously determined value.
- Sending by the program of a notification comprising information relating to the situation presenting a risk to the information device, preferably worn by the user.

According to another particular feature, the detection and monitoring method further comprises a step of locating the situation presenting a risk by the program when the latter detects said situation presenting a risk.

According to another particular feature, the detection and monitoring method comprises a step of recording video sequences of the detected situation presenting a risk in the database of the device, the method further comprising a step of automatic learning, wherein the artificial neural network trains itself on the new recorded video sequences in order to improve the detection of situations presenting a risk.

BRIEF DESCRIPTION OF THE FIGURES

Other features, details and advantages of the invention will emerge from reading the following description, with reference to the appended figures, wherein.

DETAILED DESCRIPTION OF THE INVENTION

Numerous combinations can be contemplated without departing from the scope of the invention: the person skilled in the art will choose one or the other based on economic, ergonomic or size constraints or other constraints they have to comply with.

Generally speaking, the present invention comprises a device (2) for detecting drowning individuals or individuals in a situation presenting a risk of drowning, comprising at least one program of codes that are executable on one or more processing hardware components such as a microprocessor, the program being stored in memory in at least one readable medium and implementing an artificial neural network (20) having an automatic learning architecture composed of several layers, the artificial neural network (20) being pre-trained on image data from at least one standard non-specific database, the neural network of the program further being trained a second time by learning transfer using image data from videos of simulated or real drowning situations or situations presenting a risk of drowning, the trained program being configured by this learning transfer to identify, in new image data provided, preferably in real time, drowning situations or situations presenting a risk of drowning.

It is understood that "video sequences" is intended to mean data from successive images captured by the camera(s). A video sequence may for example, non-limitingly, consist of a sequence of successive images for a duration of 5 seconds.

It is understood that "standard" database is intended to mean a database that comprises data from images and/or video sequences representing various actions, as opposed to a specific database which would exclusively contain video sequences of real or simulated drowning situations.

In some embodiments, the device (2) for detecting drowning individuals or individuals in a situation presenting a risk of drowning, comprises at least one program of codes that are executable on one or more processing hardware components such as a microprocessor, the program being stored in memory in at least one readable medium and implementing an artificial neural network (20) having an automatic learning architecture composed of several layers, the artificial neural network (20) comprising:

- A first layer (210) comprising a network model, preferably a convolutional neural network, CNN, pre-trained on image data from a database of standard images, and preferably public, the image data being annotated and classified,
- A second layer (220) comprising a recurrent network, preferably a short and long-term memory, LSTM, recurrent network, pre-trained on video sequences from a database of standard videos, the video sequences being annotated and classified,
- A third layer (230) comprising a final classifier trained using video sequences from a specific database of videos comprising simulated or real drowning situations or situations presenting a risk of drowning, the video sequences being annotated and classified, the classifier being configured to provide as a result a probability of detecting a situation presenting a risk based on video sequences, The program being configured to use the probabilities to identify, in video sequences of a video stream provided, preferably by sensors, in particular a camera, and preferably in real time, drowning situations or situations presenting a risk of drowning.

Compared to the documents of the prior art in swimming pools, the device (2) of the present application is configured to monitor situations presenting a risk of drowning, or preceding drowning, when the swimmer has not yet sunk.

Thus, in other words, the neural network comprises different layers with specific functions. The CNN will detect shapes in the images, the LSTM will analyze successions of shapes and detect a set of modifications representative of the image, and the classifier will analyze these representative modifications and assign a probability of a drowning situation. This is all trained by a "supervised" algorithm, that is to say that the learning is carried out based on input data, in this case data from images (211) and video sequences, for which it is known whether or not said data provided as input is associated or not with a drowning situation. Indeed, said data is classified and annotated in order to teach the neural network to identify shapes and patterns, by latent representation vectors, within images and video sequences.

Advantageously, the use of these very specific videos for training the third layer (230) makes it possible to obtain a neural network which is specialized in the detection of situations presenting a risk of drowning by specialization of the final classifier using a small number of highly relevant videos. This makes it possible to greatly reduce the requirement for videos annotated manually by learning transfer, using a small number of specific videos to specialize an artificial neural network (20) pre-trained on a large amount of data from non-specific images and videos. Once the artificial neural network (20) is trained, the algorithms are weighted such that said neural network may calculate a detection probability (232) in each video sequence provided as input. This is therefore not a comparison of video sequences but rather the use of optimized algorithms represented by the different layers of the artificial neural network (20).

The video stream provided as input, for example by a camera, is broken down into video sequences that the algorithm, once trained, will process and to which it will assign a probability of detection (232), for example a 79% probability of detecting a drowning situation in a given video sequence.

Convolutional Neural Networks, or CNN, is intended to mean a convolutional neural network composed of two types of artificial neurons arranged in "layers" or sub-layers that successively process information: the processing neurons, which process a limited portion of the image (referred to as "receptive field") via a convolution function, and the neurons for (total or partial) pooling of the outputs. Non-linear and point-wise corrective processing can be applied between each layer to improve the relevance of the result.

The set of outputs from a processing layer makes it possible to reconstitute an intermediate image which will serve as a base for the following layer.

Long Short-Term Memory, or LSTM, relates to a recurrent network having short term and long term memory. A recurrent network is a network of artificial neurons having recurrent connections. These networks work on sequences of inputs. The output of each neuron is a non-linear combination of the input and the output at the previous instant.

The different layers of neurons may be models of existing networks or may be created specifically for this use, for performance reasons.

The recurrent neural networks are adapted for sequences of input data of variable size. They are in particular suitable for the analysis of temporal series. They are typically used for language analysis (sequence of words) or video analysis (sequence of images).

The artificial neural network (20) is trained by a supervised learning algorithm.

In some embodiments, the output values of the first layer (210) are composed of latent representation vectors (212) of the image data (211) and are combined to form sequences of latent representation vectors (221) as input values for the second layer (220). In some embodiments, the outputs of the second layer (220) form a representation vector of the video sequence (231), and form the inputs for the third layer (230).

In some embodiments, the device (2) further comprises a notification module able to send an alert message to an information receiving device (3).

In some embodiments, the program of the device (2), during the detection of a drowning situation or a situation presenting a risk of drowning, executes a code making it possible to calculate and indicate the location, for example the GPS location, of the detected situation.

This is made possible by the prior calibration of the video images provided by the camera in relation to the associated GPS data. For example, a virtual matrix of GPS points can be superimposed over the field of the camera, which will be deformed due to the camera angle. Depending on where the representation vectors corresponding to a drowning situation are detected, the program of the device (2) may indicate the GPS location of said detection. This has the advantage of being able to rapidly inform the user of the device (2) where the event is located. In some embodiments, when the position of the user is also known, the device (2) is configured to send a notification to the user closest to said event.

In some embodiments, the program of the device (2) is further configured to process the image or the image stream received in order to produce an augmented image or a stream of augmented images, displaying for example an area containing the situation presenting a risk. This advantageously makes it possible to provide, as output from the device (2), an image or a stream of images (video stream) of the situation, to which additional information is added by the program, for example GPS coordinates, an illustration of the area where the detected event is, or else the type of event identified or the probability of the risk of drowning. This image or this stream of images can thus be communicated to the user for example on a device for receiving (3) alerts and/or for displaying to a user, such as a connected watch comprising a screen.

The information mat comprise an augmented image, a location, an alert, or any other information making it possible to help a user, for example a lifeguard, to identify, detect, choose or act when confronted with a situation detected as presenting a risk.

In some embodiments, the device (2) further comprises a database of video sequences on which the detected situations presenting a risk are stored, the classifier being able to be trained by said detected situations. In other words, each of the events detected are recorded in a database of the device (2), the classifier of the artificial neural network (20) having access to this database in order to take said detected events into account and improve itself. Thus, the device (2), capable of automatic learning, can improve itself over time using the detected and recorded events. In some embodiments, the device (2), or the database of the device (2), can be connected to the video sequence database of other similar devices (2), in order to form a network of video sequence databases, the images recorded from each event identified by each device (2) being pooled between each device (2). This has the advantage of enabling them to share their detection and to improve themselves via the training of their final classifier.

In some embodiments, the device (2) is part of a system (1) for monitoring and detecting individuals in a situation presenting a risk of drowning or situations presenting a risk of drowning, said system (1) further comprising at least one image sensor, preferably a sensor for images (4) and video sequences, for example a camera, the sensor being configured to provide video sequences to the program of the detection device (2), and at least one information and/or alert receiving device (3) configured to inform a user that a drowning situation or a situation presenting a risk of drowning has been detected, the detection device (2) being configured to send a message by a notification module to the information device (2) when one of the video sequences provided by the image sensor (4) is considered to correspond to a drowning situation or a situation presenting a risk of drowning from its database.

This advantageously makes it possible for a user to identify situations presenting a risk in areas (Z) which are difficult to access or complicated to monitor, by using an automatic detection system (1) based on cameras providing data from images (211), for example aerial images, the user being informed by the information device (2) when the latter receives a message from the notification module of the device (2).

The information receiving device (3) may be a portable device (2), for example a watch, or may be a display board/panel that provides alerts about the situation.

In some embodiments, the image sensor (4) is mounted on a mast connected to said detection device (2). Aerial images enable, in certain situations, more rapid identification of situations presenting a risk, compared to cameras on the ground and/or in the water.

In some embodiments, the information receiving device (3) is configured to display location information and/or an augmented image of the situation presenting a risk, in order to inform the user by providing all the information recovered by the detection device (2).

In some embodiments, the information receiving device (3) comprises a connected watch executing an application configured to display the information received by said information device (2), and also an audible and/or vibratory alert. In some non-limiting embodiments, the information device (2) comprises at least one communication terminal, for example a smart phone, a tablet or a computer, which is in particular portable. These embodiments are non-limiting and can be combined. Thus, in some embodiments, the system (1) comprises several information devices (2), for example a connected watch enabling a rapid response by the user, and a communication terminal provided with a larger screen, for example a smart phone, a tablet or a computer able to display all the information that the device (2) has regarding the situation.

In some embodiments, the method of training, by learning transfer, of an automatic learning program configured for detecting drowning individuals or individuals presenting a risk of drowning, the program being stored in memory in at least one readable medium and comprising an artificial neural network (20) having an automatic learning architecture composed of several layers, the method comprising at least the following steps:

Non-specific training of the artificial neural network (20) by providing image data (211) and standard video sequences, wherein the image data and the video sequences have been previously annotated and classified, then Specialized training of the artificial neural network (20) by providing video sequences of simulated or real drowning situations or situations presenting a risk of drowning.

This advantageously makes it possible to greatly reduce the image requirement for specialization of the neural network. Thus, the neural network is first "mass" trained to recognize shapes and to classify them, then it is specialized in the detection of situations presenting a risk of drowning, and in particular the detection of situations in which the drowning has not yet taken place, i.e. in which the body is not yet entirely submerged. This specialization requires fewer images since it is only a question of specifically recognizing certain patterns considered to lead to a drowning situation.

In some embodiments, the method of training, by learning transfer, of an automatic learning program configured for detecting drowning individuals or individuals presenting a risk of drowning, the program being stored in memory in at least one readable medium and comprising an artificial neural network (20) having an automatic learning architecture composed of several layers, the method comprising at least the following steps:

Training a first layer (210) of the program comprising a network model network, preferably a convolutional neural network, CNN, by providing image data (211) from a database of standard images, for example public, wherein the image data has been previously annotated and classified, Training a second layer (220) of the program comprising a recurrent network, preferably a short and long-term memory, LSTM, recurrent network, by providing video sequences from a database of standard videos, preferably public, wherein the video sequences have been previously annotated and classified, Training a third layer (230) of the program comprising a final classifier by providing video sequence data from simulated or real drowning situations or situations presenting a risk of drowning, the video data having been chosen specifically and annotated as being situations presenting a risk of drowning, the classifier trained in this way being configured to provide, as a result, a probability of detecting (232) a situation presenting a risk based on video sequences.

In some embodiments, the method for detecting and monitoring drowning individuals or individuals in a situation presenting a risk of drowning, comprising at least one image sensor (4), a detection device (2) comprising a program of codes that are executable on one or more processing hardware components such as a microprocessor, the program being stored in memory in at least one readable medium and comprising an artificial neural network (20) having an automatic learning architecture and a user's information device (2), the method comprising at least the following steps:

Pre-training said program by a method according to the preceding claim;

Providing image data by an image sensor (4) to the detection device (2);

Real-time analysis of said image data by said artificial neural network (20), and providing a probability of detecting (232) a situation presenting a risk;

Detecting a situation presenting a risk, when said probability of detection (232) is greater than a previously determined value;

Sending, by the program, of a notification comprising information relating to the situation presenting a risk, to the information device (2), preferably worn by the user.

In some embodiments, the method comprises a step of locating the situation presenting a risk by the program when the latter detects said situation presenting a risk.

In some embodiments, the method comprises a step of recording video sequences of the detected situation presenting a risk in the database of the device (2), the method further comprising a step of automatic learning, wherein the artificial neural network (20) trains itself on the new recorded video sequences in order to improve the detection of situations presenting a risk.

Figure 1:
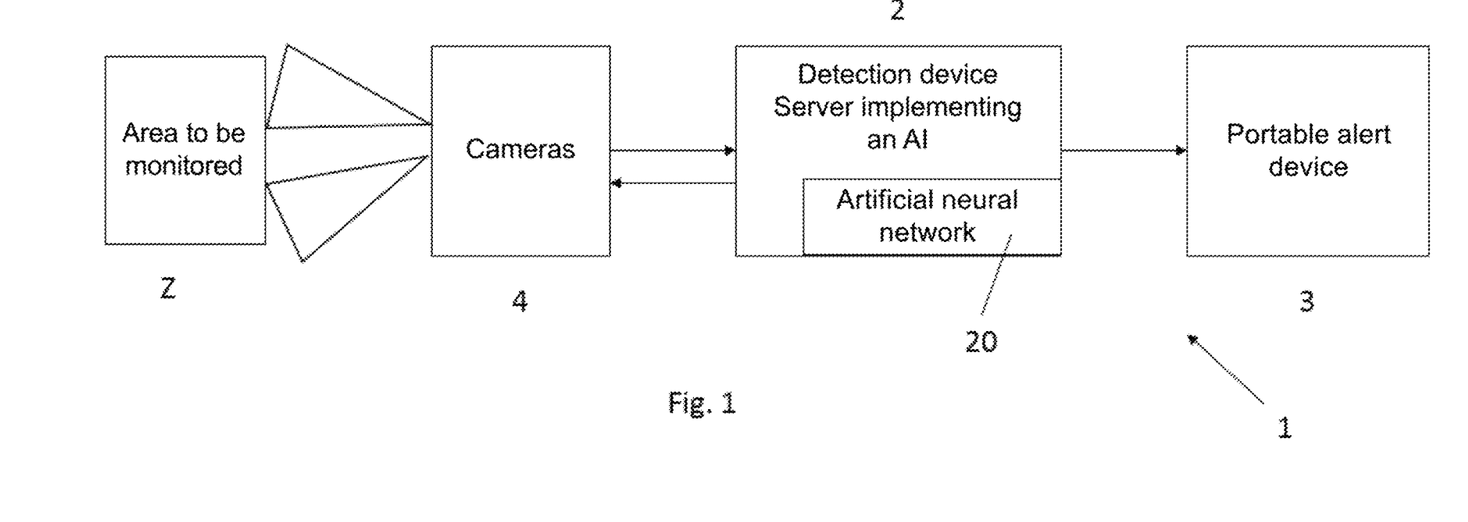
FIG. 1 shows the device according to certain embodiments.

In some embodiments, for example illustrated non-limitingly in FIG. 1, a swimming area, for example the seaside, constitutes an area to be monitored (Z). A detection system (1) is deployed to cover the area. Image sensors, for example cameras, are installed, for example on masts to provide image data with an overall aerial view of the area (Z). The image sensors are connected, via a wired or remote network, to the detection device (2), and provide said image data to the detection program. The program has been previously trained non-specifically on at least one database of various annotated images and on at least one database of annotated videos (image streams) of human actions and activities, then is specifically trained on a database of videos of situations presenting a risk of drowning. The program thus trained is configured to detect a situation presenting a risk of drowning, preferably from an aerial view, and in particular before the individual sinks. When it detects a situation presenting a risk of drowning, the device (2) sends, via its notification module, a notification to an information device (2), for example a portable information device such as a watch, in order to warn a user, for example a lifeguard. The notification may comprise an alert, an augmented image, a location or any other information liable to help the lifeguard speed up their decision making and save the individual. In some embodiments, the device (2) is configured to record, in its database, image data that made it possible to detect drowning, the program being trained on this new data in order to improve its recognition of future situations presenting a risk.

Figure 2:
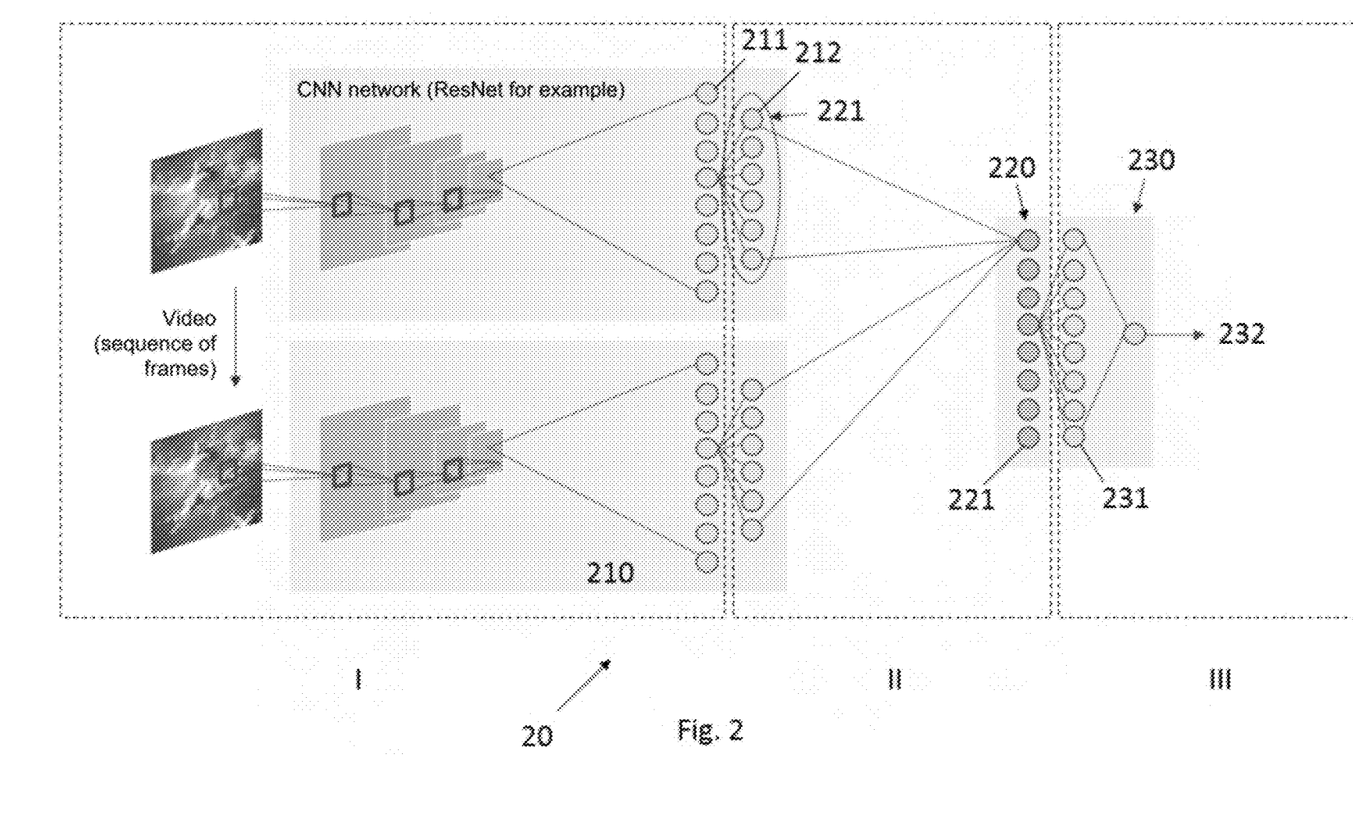
FIG. 2 shows the training method carried out on the automatic learning architecture of the artificial neural network.

More particularly, FIG. 2 illustrates an example of a non-limiting embodiment of the present invention, wherein the method for training an artificial neural network (20) comprising at least three different layers is described. The first layer (210) of the neural network is formed by a convolutional neural network (201), for example ResNet® or Inception®, and is trained, during a step I, on image data (211) from a database of standard images, i.e. which are non-specific in their content, and most often which are open-access, this first database comprising a very large number of images, for example fifteen million images, which represent highly varied subjects. A second layer (220) of the neural network, formed by a long and short-term memory recurrent network, is trained, during a step II, on video data from a database of standard videos of human actions, for example a UCF101 or HDMB database, comprising video data from categories of actions performed by humans. Finally, the third layer (230) of the neural network is formed of a final classifier, configured to classify the image data (211) between those representing a situation presenting a risk of drowning or a drowning situation, and other situations. This final classifier is trained, during a step III, by a more limited number of video sequences, for example a few tens of video sequences, which all represent different real or simulated drowning actions. Advantageously, the use of these very specific videos make it possible to obtain a neural network which is specialized in the detection of situations presenting a risk of drowning by specialization of the third layer (230) thereof, the final classifier, using a small number of specific videos. This makes it possible to greatly reduce the need for videos annotated manually by learning transfer, using a small number of specific videos to specialize an artificial neural network (20) pre-trained on a large amount of data from non-specific images and videos.

During the monitoring of an area by the device (2), the neural network receives a video stream in the form of image data. The first layer (210) pre-trained by the neural network (20) will perform a first processing of the image data (211) and provide, as output, latent representation vectors (212). The second layer (220) uses, as input, sequences of said latent representation vectors (221) and performs a second processing in order to provide, as output, a latent representation vector of the video sequence (231) which forms the input data for the classifier (230). The classifier, specialized for detecting situations presenting a risk of drowning, processes the data received as input in order to provide, as output, a probability of detection (232) of a situation presenting a risk. Based on the probability, the detection device (2) is configured to trigger or not trigger the sending of an alert, for example by a notification module to an information device (2). The alert may thus contain a simple notification of danger, an augmented image illustrating the area in which the situation presenting a risk is taking place, and/or GPS coordinates or other information liable to help a user of the device (2), for example a lifeguard.

In some embodiments, it is possible to level the alert based on the value of the probability of detection (232) of a situation presenting a risk. Thus, if a first video sequence gives a probability of detection (232) of 50%, a low-level alert can be sent. Based on the probability of detection (232) of the following video sequences, the alert level can increase, or conversely the alert can be stopped.

It will be readily apparent from reading the present application that the particular features of the present invention, as generally described and illustrated in the figures, can be arranged and designed in a wide variety of different configurations. Thus, the description of the present invention and the figures relating thereto are not intended to limit the scope of the invention but merely represent selected embodiments.

A person skilled in the art will understand that the technical features of a given embodiment may in fact be combined with features of another embodiment unless the opposite is explicitly mentioned or it is obvious that these features are incompatible. In addition, the technical features described in a given embodiment may be isolated from the other features of this mode unless the opposite is explicitly stated.

It must be obvious to those skilled in the art that the present invention enables embodiments in numerous other specific forms without departing from the field defined by the scope of the appended claims; they must be considered as illustrative and the invention must not be limited to the details given above.

LIST OF REFERENCE SIGNS

1. Detection system
2. Detection device
3. Receiving device
4. Image sensor
20. Artificial neural network
210. First layer, CNN network
211. Image data
212. Latent representation vector
220. Second layer, LSTM recurrent network
221. Input: Sequence of latent representation vector
230. Third layer, final classifier
231. Input: Representation vector of the video sequence
232. Output: Probability of detection
Z Area to be monitored

What is claimed is:

1. A device for detecting drowning individuals or individuals in a situation presenting a risk of drowning, comprising at least one program of codes that are executable on one or more processing hardware components comprising a microprocessor, the at least one program being stored in memory in at least one readable medium and implementing an artificial neural network having an automatic learning architecture composed of several layers, wherein the artificial neural network comprises:
   a first layer comprising a network model comprising a convolutional neural network (CNN), pre-trained on image data from a database of standard images, wherein the database of standard images is public, and wherein the image data is annotated and classified,
      wherein the database of standard images comprises data from images that represent various actions and real or simulated drowning situations,
      wherein the CNN is configured to detect shapes in the image data,
   a second layer comprising a recurrent network, preferably comprising a short and long-term memory (LSTM) recurrent network, pre-trained on video sequences from a database of standard videos, the video sequences being annotated and classified,
      wherein the LSTM recurrent network is configured to analyze successions of shapes in the database of standard videos and detect a set of modifications representative of the image data,
   a third layer comprising a classifier trained on video sequences from a specific database of videos comprising simulated or real drowning situations or situations presenting a risk of drowning, the video sequences from the specific database being annotated and classified,
      wherein the classifier is configured to
         analyze the set of modifications representative of the image data, and
         provide, as a result, a probability of detecting a situation presenting a risk based on the video sequences of the specific database,
   wherein the at least one program is configured to use the probability to identify, in video sequences of a video stream provided by sensors, drowning situations or situations presenting a risk of drowning,
   wherein the sensors comprise a camera, and
   wherein the drowning situations or the situations presenting a risk of drowning are detected in real time as detected situations.

2. The device for detecting drowning individuals or individuals in a situation presenting a risk of drowning according to claim 1, wherein output values of the first layer are composed of latent representation vector of image data and are combined to form sequences of latent representation vectors as input values for the second layer.

3. The device for detecting drowning individuals or individuals in a situation presenting a risk of drowning according to claim 1, wherein the outputs of the second layer form a representation vector of the video sequences, provided as input for the third layer.

4. The device for detecting drowning individuals or individuals in a situation presenting a risk of drowning according to claim 1, further comprising a notification module able to send an alert message to an information receiving device.

5. The device for detecting drowning individuals or individuals in a situation presenting a risk of drowning according to claim 1, wherein the at least one program, during the identify of the drowning situations or situations presenting a risk of drowning, executes a code making it possible to calculate and indicate a location, comprising a GPS location, of the detected situations.

6. The device for detecting drowning individuals or individuals in a situation presenting a risk of drowning according to claim 1, wherein the at least one program is further configured to process an image or an image stream received in order to produce an augmented image or a stream of augmented images, displaying an area containing the situation presenting a risk.

7. The device for detecting drowning individuals or individuals in a situation presenting a risk of drowning according to claim 1, wherein the device further comprises a database of video sequences on which the detected situations are stored, wherein the classifier is trained by said detected situations.

8. The device for detecting drowning individuals or individuals in a situation presenting a risk of drowning according to claim 1, wherein the device communicates with another similar detection device in order to share the detected situations presenting a risk that are stored in their video sequence database in order to improve their classifier.

9. A system for monitoring and detecting individuals in a situation presenting a risk of drowning or situations presenting a risk of drowning, the detection of the individuals in situation presenting a risk of drowning or the situations presenting a risk of drowning being carried out by a device for detecting drowning individuals or individuals in a situation presenting a risk of drowning, comprising at least one program of codes that are executable on one or more processing hardware components comprising a microprocessor, the at least one program being stored in memory in at least one readable medium and implementing an artificial neural network having an automatic learning architecture composed of several layers, wherein the artificial neural network comprises
 a first layer comprising a network model comprising a convolutional neural network (CNN), pre-trained on image data from a database of standard images, wherein the database of standard images is public, and wherein the image data is annotated and classified,
  wherein the database of standard images comprises data from images that represent various actions and real or simulated drowning situations,
  wherein the CNN is configured to detect shapes in the image data,
 a second layer comprising a recurrent network comprising a short and long-term memory (LSTM) recurrent network, pre-trained on video sequences from a database of standard videos, the video sequences being annotated and classified,
  wherein the LSTM recurrent network is configured to analyze successions of shapes in the database of standard videos and detect a set of modifications representative of the image data,
 a third layer comprising a classifier trained on video sequences from a specific database of videos comprising simulated or real drowning situations or situations presenting a risk of drowning, the video sequences from the specific database being annotated and classified,
  wherein the classifier is configured to
   analyze the set of modifications representative of the image data, and
   provide, as a result, a probability of detecting a situation presenting a risk based on the video sequences of the specific database,
 wherein the at least one program is configured to use the probability to identify, in video sequences of a video stream provided by sensors, drowning situations or situations presenting a risk of drowning,
 wherein the sensors comprise a camera, and
 wherein the drowning situations or the situations presenting a risk of drowning are detected in real time as detected situations
wherein said system comprises:
 at least one image sensor comprising a sensor for images and video sequences from a video stream, the sensor being configured to provide video sequences to the at least one program of the device,
 at least one information receiving device configured to inform a user that a drowning situation or a situation presenting a risk of drowning has been detected, the device being configured to send a message by a notification module to the at least one information receiving device when one of the video sequences provided by the at least one image sensor is considered to correspond to the drowning situation or the situation presenting a risk of drowning from its database.

10. The system for monitoring and detecting according to claim 9, wherein the at least one image sensor is mounted on a mast connected to said device.

11. The system for monitoring and detecting according to claim 9, wherein the at least one information receiving device is configured to display one or more of location information and an augmented image of the situation presenting a risk of drowning.

12. The system for monitoring and detecting according to claim 9, wherein the at least one information receiving device comprises a connected watch executing an application configured to display information received by said at least one information receiving device, and one or more of an audible and vibratory alert.

13. A method for training by learning transfer of an automatic learning program configured for detecting drowning individuals or individuals in a situation presenting a risk of drowning, the automatic learning program being stored in memory in at least one readable medium and comprising an artificial neural network comprising an automatic learning architecture composed of several layers, wherein the method comprises:
 training a first layer of the automatic learning program comprising a network model by providing image data from a database of standard images,
  wherein the network model comprises a convolutional neural network (CNN),
  wherein the database of standard images is public,
  wherein the database of standard images comprises data from images that represent various actions and real or simulated drowning situations,
  wherein the CNN is configured to detect shapes in the image data, and
  wherein the image data is previously annotated and classified, training a second layer of the automatic learning program comprising a recurrent network, by providing video sequences from a database of standard videos,
  wherein the recurrent network comprises a short and long term memory (LSTM) recurrent network,
  wherein the database of standard videos is public,
  wherein the LSTM recurrent network is configured to analyze successions of shapes in the database of standard videos and detect a set of modifications representative of the image data, and
  wherein the video sequences are previously annotated and classified,
training a third layer of the automatic learning program comprising a classifier by providing video sequence data from simulated or real drowning situations or situations presenting a risk of drowning, wherein the video sequence data is chosen specifically and annotated as being situations presenting a risk of drowning,
  wherein the classifier analyzes the set of modifications representative of the image data, and
  wherein the classifier is trained to provide, as a result, a probability of detecting a situation presenting a risk based on video sequences of the video sequence data.

14. The method of claim 13 further comprising:
pre-training a program of codes from a detection device that are executable on one or more processing hardware components, wherein the program of codes is stored by said memory of said at least one readable medium by a method learning transfer of said automatic learning program,
  wherein said detection device comprises an artificial neural network comprising an automatic learning architecture, and wherein the detection device further comprises a user's information device;
providing image data by an image sensor to the detection device;
real-time analysis of said image data by said artificial neural network, and providing a probability of detecting a situation presenting a risk;
detecting the situation presenting a risk, when said probability of detection is greater than a previously determined value;
sending, by the program of codes, of a notification comprising information relating to the situation presenting a risk, to the user's information device,
  wherein the user's information device is worn by a user.

15. The method according to claim 14, further comprising locating the situation presenting a risk by the program of codes when the program of codes detects said situation presenting a risk.

16. The method according to claim 15, further comprising
recording video sequences of the situation presenting a risk that is detected in a database of the detection device,
automatic learning, wherein the artificial neural network trains itself on new recorded video sequences in order to improve detection of the situations presenting a risk.

* * * * *